(12) United States Patent
Watanabe et al.

(10) Patent No.: US 7,910,233 B2
(45) Date of Patent: Mar. 22, 2011

(54) MAGNETIC RECORDING MEDIUM FOR THERMALLY ASSISTED RECORDING

(75) Inventors: Takeshi Watanabe, Nagano (JP); Kunihiro Imai, Nagano (JP); Takako Matsumoto, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 0 days.

(21) Appl. No.: 12/261,014

(22) Filed: Oct. 29, 2008

(65) Prior Publication Data

US 2009/0110959 A1    Apr. 30, 2009

(30) Foreign Application Priority Data

Oct. 31, 2007  (JP) ................. 2007-284148

(51) Int. Cl.
*G11B 5/66* (2006.01)
(52) U.S. Cl. ................. 428/835.8; 369/13.02
(58) Field of Classification Search .............. None
See application file for complete search history.

(56) References Cited

U.S. PATENT DOCUMENTS

| | | | | |
|---|---|---|---|---|
| 6,096,694 | A * | 8/2000 | Tei et al. ............ | 508/562 |
| 6,645,634 | B1 | 11/2003 | Shirai et al. | |
| 2006/0105203 | A1 * | 5/2006 | Li et al. ............ | 428/833 |

FOREIGN PATENT DOCUMENTS

| | | |
|---|---|---|
| JP | 2001-6155 A | 1/2001 |
| JP | 2003-45004 A | 2/2003 |
| JP | 2006-12249 A | 1/2006 |
| JP | 2007-16124 A | 1/2007 |

OTHER PUBLICATIONS

Stirniman et al, "Volatility of perfluoropolyether lubricants measured by thermogravimetric analysis", 1999, Tribology Letters, vol. 6, pp. 199-205.*

* cited by examiner

*Primary Examiner* — Holly Rickman
(74) *Attorney, Agent, or Firm* — Rossi, Kimms & McDowell LLP

(57) ABSTRACT

A magnetic recording medium for use in a thermally assisted recording system is disclosed. The magnetic recording medium comprises at least a magnetic layer, a protective layer and a lubricant layer formed on a nonmagnetic substrate, wherein a lubricant of the lubricant layer exhibits such a heat resistance that an amount of volatilization when the magnetic layer is heated to a temperature not lower than a temperature Tw is less than 1% with respect to an initial amount of the lubricant in an unheated condition. The present invention addresses a problem of the heat resistance performance of the lubricant for use in magnetic recording media and provides a magnetic recording medium exhibiting high heat resistance.

4 Claims, 4 Drawing Sheets

MAGNETIC RECORDING MEDIUM FOR THERMALLY ASSISTED RECORDING

BACKGROUND OF THE INVENTION

A. Field of the Invention

The present invention relates generally to a magnetic recording medium and in particular, to a magnetic recording medium for use in external storage devices of computers or the like.

B. Description of the Related Art

Various types of lubricants for magnetic recording media, in particular for magnetic disks, have been developed for the purpose of reducing a frictional force generated between a protective layer and a magnetic head, and improving durability and reliability.

In order to improve lubrication performance of a surface layer of a magnetic recording medium, a perfluoropolyether lubricant having a polar end group such as a hydroxyl group or a cyclic triphosphazene end group in the molecule, for example, has conventionally been applied on a protective layer of diamond like carbon (DLC). For example, according to Japanese Unexamined Patent Application Publication No. 2001-006155 a mixture of various types of perfluoropolyether lubricant containing various polar end groups is applied.

In order to achieve a planar recording density over 1 Tbits/$in^2$ in a magnetic recording medium, particle size of the magnetic layer needs to be decreased to reduce noise. An excessively small particle size, however, raises a problem that magnetic signals recorded in the magnetic layer disappear due to thermal demagnetization. Consequently, high density recording requires use of a magnetic layer that exhibits high thermal stability and high coercivity.

Accordingly, Japanese Unexamined Patent Application Publication Nos. 2003-045004 and 2006-012249 have proposed methods in which laser light is irradiated on recording regions of a magnetic recording medium having a recording layer with high coercivity to heat and decrease the coercivity, and a magnetic field is applied to the regions with the decreased coercivity using a magnetic head corresponding to the information to be recorded. This recording method is called thermally assisted magnetic recording.

In the thermally assisted magnetic recording process, a recording layer is heated up to a temperature of about 150° C. by the irradiation of laser light on the recording plane. As a result, the lubricant is exposed to a high temperature due to thermal conduction from the recording layer.

Conventionally used lubricants, however, are not suitable for use in a high temperature environment such as occurs in thermally assisted magnetic recording. Thus, there is a concern about decrease of lubricant due to volatilization in the high temperature environment.

The present invention is directed to overcoming or at least reducing the effects of one or more of the problems set forth above.

SUMMARY OF THE INVENTION

It is therefore an object of the present invention to address the problem of heat resistance of the lubricant and to provide a magnetic recording medium exhibiting high heat resistance.

A magnetic recording medium of the present invention is a magnetic recording medium used in a thermally assisted recording system, and the magnetic recording medium comprises at least a magnetic layer, a protective layer and a lubricant layer formed on a nonmagnetic substrate. The lubricant of the lubricant layer exhibits a heat resistance such that an amount of volatilization when the magnetic layer is heated to a temperature not lower than a temperature Tw is less than 1% with respect to an initial amount of the lubricant in an unheated condition. The temperature Tw in this specification and the appended claims refers to the maximum temperature of the magnetic layer in the thermally assisted recording process.

The lubricant in the lubricant layer according to the present invention preferably is a compound represented by the formula (1) below, and has a molecular weight in the range of 500 to 10,000.

Chemical Formula 1

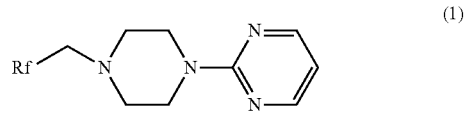

(1)

wherein "Rf" represents $CF_3CF_2CF_2O$—$(CF_2CF_2CF_2O)_n$—$CF_2CF_2$, where "n" is a positive integer.

The temperature "Tw" in the invention is preferably in the range of 150° C. to 350° C.

In a thermally assisted recording method according to the present invention in which a magnetic layer experiences a temperature in the range of 150° C. to 350° C., an amount of volatilization of the lubricant is suppressed as compared with conventional technologies, and a magnetic recording medium exhibiting high heat resistant performance is provided.

By applying a lubricant represented by Formula (1) on a protective layer of diamond like carbon (DLC) according to the invention, the bond between the lubricant and the surface of the protective layer of diamond like carbon (DLC) is enhanced and a magnetic recording medium exhibiting a firm bond between the lubricant and the diamond like carbon (DLC) is provided.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1:
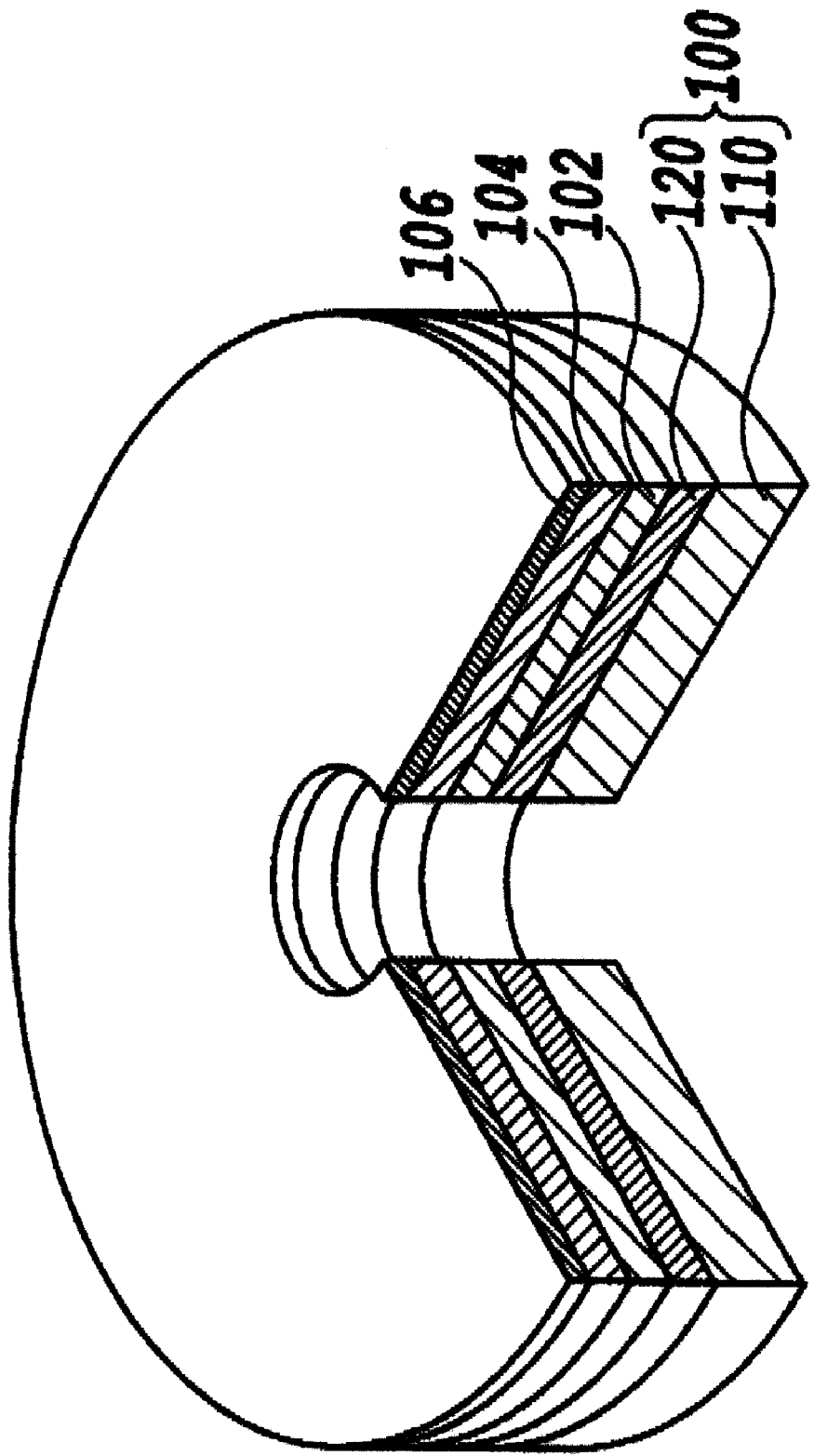
FIG. 1 shows a schematic layer structure of an example of magnetic recording medium of the invention.

A magnetic recording medium according to the invention is most suited for a thermally assisted magnetic recording system. A magnetic recording medium of the invention comprises at least a magnetic recording layer, a protective layer and a lubricant layer provided on a nonmagnetic substrate. A lubricant composing the lubricant layer exhibits heat resistance in which an amount of volatilization of the lubricant when the magnetic layer is heated up to a temperature not lower than the temperature Tw is less than 1% with respect to an initial amount of the lubricant in an unheated condition. Thus, the lubricant of the lubricant layer of the invention is characterized in that an amount of volatilization of the lubricant when the magnetic layer is heated up to a temperature not lower than the temperature Tw is less than 1% with respect to an initial amount of the lubricant in an unheated condition.

A lubricant of the invention is not limited to a special lubricant as long as the lubricant is a type for use in magnetic recording media and satisfies the conditions described above. A preferred lubricant used in a lubricant layer is the one described in the following.

A lubricant used in the invention is preferably one of the lubricants represented by the general formula (1) below. The lubricant preferably has a molecular weight in the range of 500 to 10,000.

Chemical Formula 2

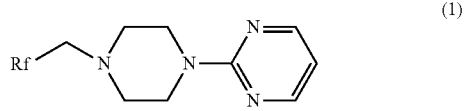

(1)

wherein "Rf" represents $CF_3CF_2CF_2O-(CF2CF2CF2O)_n-CF_2CF_2$, and "n" is a positive integer, preferably in the range of 3 to 60.

The temperature "Tw" in the invention is in the range of 150° C. to 350° C., preferably about 150° C.

The lubricant can be applied on the surface of a magnetic recording medium by means of various methods for example, a dip coating method, a spin coating method, and the like. A preferred lubricant in the invention is a compound having a principal chain of perfluoropolyether, for example, Demnum (a product of Daikin Industries Ltd.). The lubricant has as an end group an amine group represented by Formula (2) below.

Chemical Formula 3

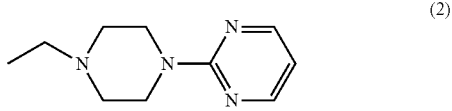

(2)

Lubricants having an amine end group exhibit high adhesiveness between the molecules and also bond easily with polar functional groups present on the protective layer surface of a magnetic disk. Therefore, application of a lubricant according to the invention on the surface of a magnetic recording medium suppresses volatilization and results in a magnetic recording medium with high heat resistance.

Now, a magnetic recording medium according to the invention will be described in the following. A magnetic recording medium according to the invention comprises at least a magnetic layer, a protective layer and a lubricant layer formed on a nonmagnetic substrate. An example of the magnetic recording layer has a structure shown in FIG. 1. The magnetic recording medium in FIG. 1 has nonmagnetic substrate 100, and magnetic layer 102, protective layer 104 and lubricant layer 106 formed on nonmagnetic substrate 100.

The nonmagnetic substrate is not particularly limited and can be selected from any of those used conventionally in magnetic recording media. For example, the nonmagnetic substrate can have a conventional commonly used structure as shown in FIG. 1 in which nonmagnetic metallic layer 120 (a plating layer) of Ni—P is formed on base plate 110 of an aluminum alloy or the like by electroless plating. Alternatively, the nonmagnetic substrate can be composed of glass, ceramic, or plastic.

A magnetic recording medium of the invention can be provided, as necessary, with a nonmagnetic underlayer, a soft magnetic layer, a seed layer, and an intermediate layer between the nonmagnetic substrate and the magnetic layer.

A nonmagnetic underlayer, which is optionally provided, can be formed of a nonmagnetic material including tantalum, titanium, and chromium-containing nonmagnetic material such as a CrTi alloy.

A soft magnetic layer, which is optionally provided, can be formed of a crystalline material such as FeTaC or a sendust alloy (an FeSiAl alloy); a micro crystalline material such as FeTaC, CoFeNi, or CoNiP; or an amorphous material of cobalt-containing alloy such as CoZrNd, CoZrNb, or CoTaZr. The soft magnetic layer is provided to concentrate the vertical magnetic field in the magnetic layer. A thickness of the soft magnetic layer, although the optimum value thereof varies depending on the structure and characteristic of a magnetic head used for recording, is preferably in the range of 10 nm to 500 nm in consideration of balance with productivity.

A seed layer, which is optionally provided, can be formed of a metal or an alloy having a face centered cubic structure, or tantalum or a tantalum alloy. Useful metals and alloys having a face centered cubic structure include Cu, Pd, Pt, Ni and alloys containing one or more of these elements; permalloy materials such as NiFe, NiFeNb, NiFeCr, NiFeSi and NiFeB; permalloy materials containing an additive of cobalt such as CoNiFe, CoNiFeNb, CoNiFeCr, CoNiFeSi and CoNiFeB; Co; and cobalt-based alloys such as CoB, CoSi, CoNi and CoFe. The seed layer desirably has a thickness sufficient to control the crystal structure of the magnetic layer and preferably has a thickness in the range of 3 nm to 50 nm in ordinary cases.

An intermediate layer, which is optionally provided, can be formed of ruthenium or an alloy mainly composed of ruthenium, or cobalt or an alloy mainly composed of cobalt. A laminate of these metals or alloys can also be used. The intermediate layer ordinarily has a thickness in the range of 0.1 nm to 30 nm. A thickness in this range provides the properties necessary for high density recording to the magnetic layer without deteriorating magnetic properties and electromagnetic conversion characteristics of the magnetic layer.

The underlayer, the soft magnetic layer, the seed layer and the intermediate layer can be formed by means of any method known in the art such as by sputtering (including DC magnetron sputtering and RF magnetron sputtering) or by vacuum evaporation.

A magnetic layer can be formed preferably using a ferromagnetic material of an alloy containing at least cobalt and platinum. For perpendicular (or vertical) magnetic recording, the axis of easy magnetization (the c-axis in the hexagonal closest packed (hcp) structure) of the magnetic layer material needs to align in the direction perpendicular to the surface of recording medium (the principal plane of the substrate of the magnetic recording medium). The magnetic layer can be formed of an alloy material such as CoPt, CoCrPt, CoCrPtB, or CoCrPtTa. A thickness of the magnetic layer, although not limited to special values, preferably is not larger than 30 nm, and more preferably not larger than 15 nm from the view points of productivity and enhancement of recording density. The magnetic layer can be formed by means of any method known in the art such as by sputtering (including DC magnetron sputtering and RF magnetron sputtering) or by vacuum evaporation.

Alternatively, the magnetic layer can be formed of a material having a granular structure in which magnetic crystalline particles are dispersed in a matrix of nonmagnetic oxide or nonmagnetic nitride. Useful materials having the granular structure include CoPt—$SiO_2$, CoCrPt—$TiO_2$, CoCrPtO, CoCrPt—$SiO_2$, CoCrPt—$Al_2O_3$, CoPt—AlN, CoCrPt—$Si_3N_4$, although not limited to these materials. Use of the material having a granular structure promotes magnetic isolation between adjacent magnetic crystalline particles in the magnetic layer, thereby improving magnetic recording performances including reduction of noise, enhancement of SNR, and improvement in recording resolution.

A protective layer can be formed of diamond like carbon (DLC) or other various thin layer materials known as materials for a protective layer of magnetic recording media. The protective layer is provided to protect the magnetic layer and other layers formed under the protective layer. The protective layer can be formed generally by means of sputtering (including DC magnetron sputtering and RF magnetron sputtering), vacuum evaporation, CVD, or FCVA (filtered cathodic vacuum arc).

A lubricant layer is provided to lubricate the magnetic recording medium when it is in contact with a magnetic head for read/write operation. The lubricant layer is formed using the liquid lubricant described hereinbefore. The liquid lubricant layer can be formed by means of any application method known in the art for example, a dip coating method, a spin coating method, or the like.

EXAMPLES

The present invention will be described more in detail with reference to some specific embodiment examples according to the invention. The examples, however, are only illustrative and are not intended to limit the invention.

A lubricant of compound (A) having a structure shown below was prepared and applied on the magnetic recording media, and the magnetic recording media were evaluated for performances thereof.

Chemical Formula 4

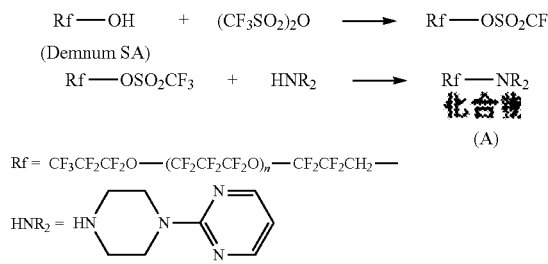

1. Method of Synthesizing the Lubricant (Compound (A))

Demnum SA (100.0 g), which is perfluoropolyether having an end group of a hydroxyl group (—OH) produced by Daikin Fine Chemical Laboratory Co., Ltd., and pyridine (5.9 g) were dissolved in Novec HFE-7100 (100.0 g) supplied from Sumitomo 3M Limited, and the resulting solution was cooled down to 0° C. Trifluoromethane sulfonic acid anhydride (21.2 g) was dissolved in HFE-7100 (100.0 g), and the resulting solution was dropped slowly into the above-described Demnum solution. After dropping, the reaction mixture was held at a room temperature and stirred for 5 hours. The end point of the reaction was confirmed by NMR. The HFE-7100 of the resulting reaction mixture was removed by distillation and the remaining substance was cleaned with pure water, obtaining a target substance of triflate (96.0 g, yield 90%).

The thus-obtained triflate is subjected to reaction with various types of amino group-containing compounds to prepare a target material of perfluoropolyether liquid lubricant having an amine type functional group at the end of a straight chain molecule.

In order to incorporate the amine type functional group, the following were charged in a reactor vessel: the triflate (30.0 g) synthesized as described above, 1-(2-pyrimidyl) piperazine (9.8 g), 1,3-bis-trifluoromethyl benzene (60.0 g), and ethylene glycol dimethyl ether (60.0 g). The reacting solution was heated to 120° C. and stirred for 8 hours. Disappearance of the raw material was confirmed by NMR. The solvent in the resulting reaction mixture was removed by distillation and cleaned with pure water, obtaining a target substance of the compound (A) (22.7 g, yield 70%) having an amino group at the end of a straight chain molecule. The compound (A) was measured by $^1$H-NMR obtaining the following results, which confirmed achieving the desired structure.

Data on the Compound (A)

$^1$H-NMR (400 MHz, m-xylene hexafluoride+$CDCl_3$): 2.71 ppm (t, 2H), 3.03 ppm (t, 1H), 3.89 ppm (t, 2H).

2. Evaluation of the Lubricant

Evaluation of Heat Resistance Performance by Thermo Gravimetric Analysis: TG

To evaluate the lubricant in the invention, evaluation for heat resistance performance was conducted by thermo gravimetric analysis. Samples used in the evaluation were the lubricant (having a molecular weight of 4,000) prepared as described above and Z-tetraol™ (a product of Solvey Solexis Inc., having a molecular weight of 4,000), the latter being a material of the prior art.

Figure 2:
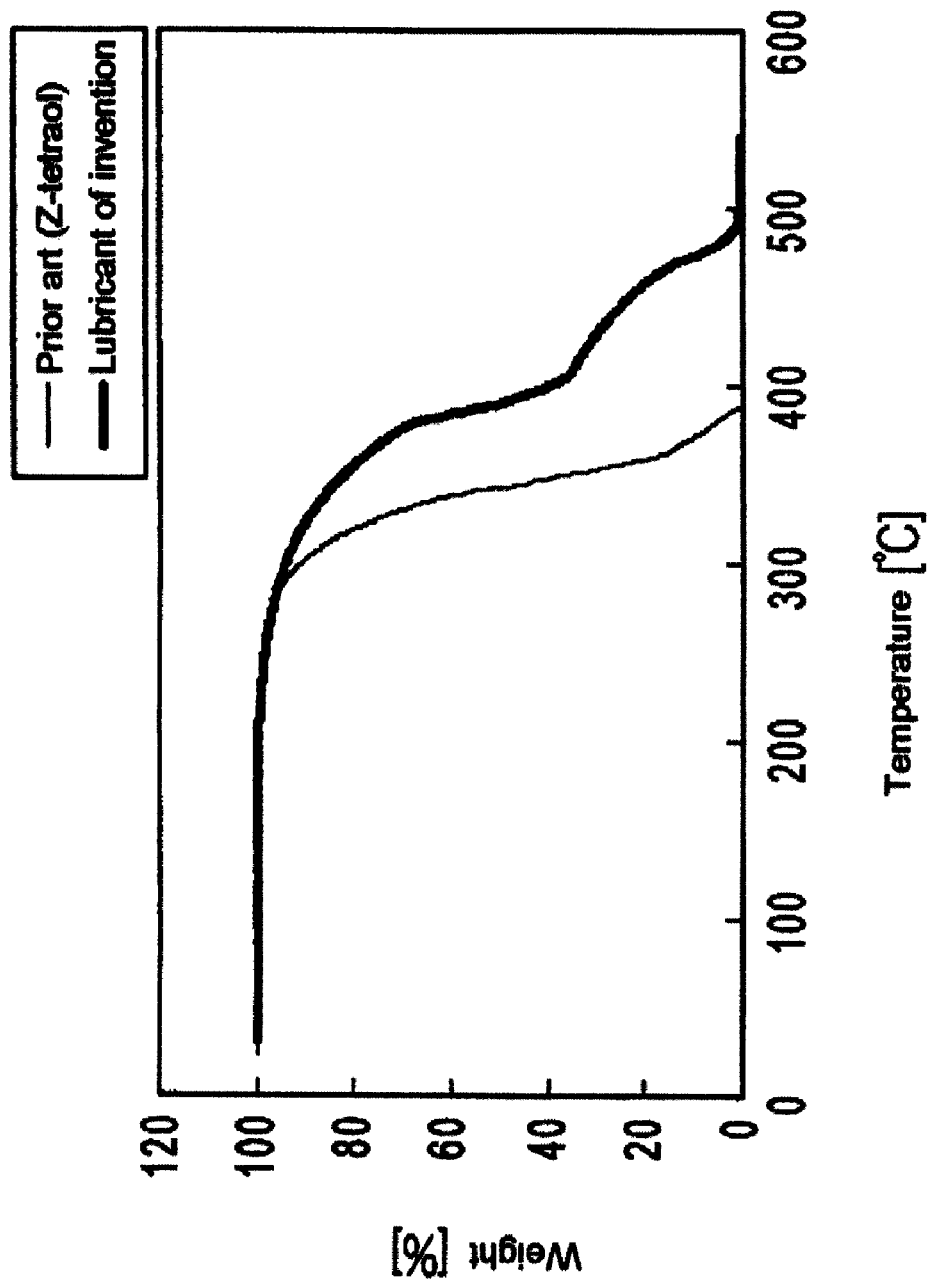
FIG. 2 is a graph comparing a lubricant of a prior art and a lubricant of the compound (A) according to the invention in an evaluation of heat resistance performance by means of thermogravimetry analysis.

Measurement was conducted using TG/DTA220 manufactured by Seiko Instruments Inc. at a temperature rising rate of 10° C./min, a result of which is given in FIG. 2. As clearly shown in FIG. 2, the lubricant of the invention is less volatile, and therefore less is lost than with the conventional lubricant at temperatures higher than 300° C. The temperature at which an amount of lubricant decreases to 50% of the initial amount of the lubricant was 329° C. for the conventional lubricant and 390° C. for the above described lubricant of the invention. Thus, it has been demonstrated that application of the lubricant of the invention increases the heat resistant temperature.

3. Fabrication of Magnetic Recording Medium (Sample)

On a principal surface of a nonmagnetic substrate (a substrate for magnetic discs having a diameter of 95 mm and composed of an aluminum alloy), the following were sequentially formed by sputtering: a soft magnetic layer of CoZrNb with a thickness of 50 nm, a seed layer of CoNiFeSi with a thickness of 5 nm, an intermediate layer of ruthenium with a thickness of 10 nm, and a magnetic layer composed of CoCrPt—$SiO_2$ and CoCrPtB with a thickness of 16 nm.

Then, a 4.0 nm thick protective layer of diamond like carbon (DLC) was formed by plasma CVD. On the magnetic disk substrate covered with this protective layer, a lubricant solution of the compound (A) synthesized by the method described above was applied by a dip coating method. More specifically, the disk substrate was immersed in a lubricant solution with a concentration of 50 ppm in the case of the film thickness of 0.8 nm and 100 ppm in the case of the film thickness of 1.2 nm, using a solvent of Vertrel XF and for a period of time of 60 seconds in the case of the film thickness of 0.8 nm and 480 seconds in the case of the film thickness of 1.2 nm. Then, the magnetic disk was lifted at a rate of 1.0 mm/sec, and dried at a room temperature of 22° C.

For comparison, a conventional lubricant of Z-tetraol™ (a product of Solvey Solexis Inc.) was also applied on a substrate by a similar dip coating method as for the lubricant of the invention. More specifically, the disk substrate was immersed in a lubricant solution with a concentration of 120 ppm in the case of the film thickness of 0.8 nm and 500 ppm in the case of the film thickness of 1.2 nm using a solvent of Vertrel XF and for a period of time of 60 sec. Then, the magnetic disk was lifted at a rate of 0.5 mm/sec in the case of the film thickness of 0.8 nm and 1.5 mm/sec in the case of the film thickness of 1.2 nm, and dried at a room temperature of 22° C.

4. Evaluation of the Magnetic Recording Media 4-1. Bonding Fraction

The samples of magnetic recording media fabricated by the above-described procedures were heated in a furnace at 110° C. for 30 minutes. The samples after the heat treatment were measured for thicknesses of the lubricant layer (a total lubricant thickness and a bonding lubricant thickness) before and after cleaning to calculate a bonding fraction, results of which are given in Table 1. The thickness of the lubricant was measured with a Fourier transform infrared spectrophotometer (FT-IR).

TABLE 1

| lubricant | initial lubricant thickness [nm] | bonding lubricant thickness [nm] | bonding fraction [%] |
| --- | --- | --- | --- |
| Comp Ex 1 | Z-tetraol ™ | 0.79 | 0.49 | 62 |
| Example 1 | compound (A) | 0.82 | 0.52 | 63 |
| Comp Ex 2 | Z-tetraol ™ | 1.18 | 0.58 | 49 |
| Example 2 | compound (A) | 1.21 | 0.60 | 50 |

Descriptions for the initial lubricant thickness, bonding lubricant thickness, and bonding fraction in Table 1 are as follows.

A bonding fraction between a lubricant and functional groups present on a carbon surface is generally represented by a ratio of a lubricant thickness after cleaning with a fluorine-containing solvent to a lubricant thickness before cleaning with the fluorine-containing solvent. The percentage of the ratio is called a bonding fraction.

$$\text{Bonding fraction [\%]} = \frac{\text{lubricant layer thickness after cleaning}}{\text{lubricant layer thickness before cleaning}} \times 100 \quad \text{Numerical Formula 1}$$

In the formula, the thickness of the lubricant layer of the heat treated sample before cleaning is called the initial lubricant thickness in Table 1, and the thickness of the lubricant layer after cleaning is called the bonding lubricant thickness in the Table 1. The bonding lubricant thickness represents the thickness (or quantity) of the lubricant actually bonding to the carbon surface. In this specification, the wording "initial lubricant quantity" is used as meaning the same as "initial lubricant thickness."

A fluorine-containing solvent Vertrel XF (a product of Mitsui-DuPont Fluorochemical Co., Ltd.) is commonly used for cleaning a lubricant, and the solvent was also used in the above-described evaluation. The cleaning was conducted by dipping the samples in this fluorine-containing solvent at 22° C. for 5 min.

4-2. Evaluation of Loss by Heating

Evaluation of loss by heating was conducted on the samples fabricated in the above-described procedure and having the initial lubricant thickness shown in Table 1.

In the evaluation tests, the samples were kept standing in environments at temperatures of 25° C., 100° C., 150° C., and 180° C. for 10 minutes and film thicknesses for the temperatures were measured by the FT-IR. In the environment at a temperature of 180° C., the samples were kept standing for a further 20 minutes (total duration of 30 minutes) and the film thicknesses were measured for comparing the sample according to the invention with the sample of conventional technology.

Figure 3:
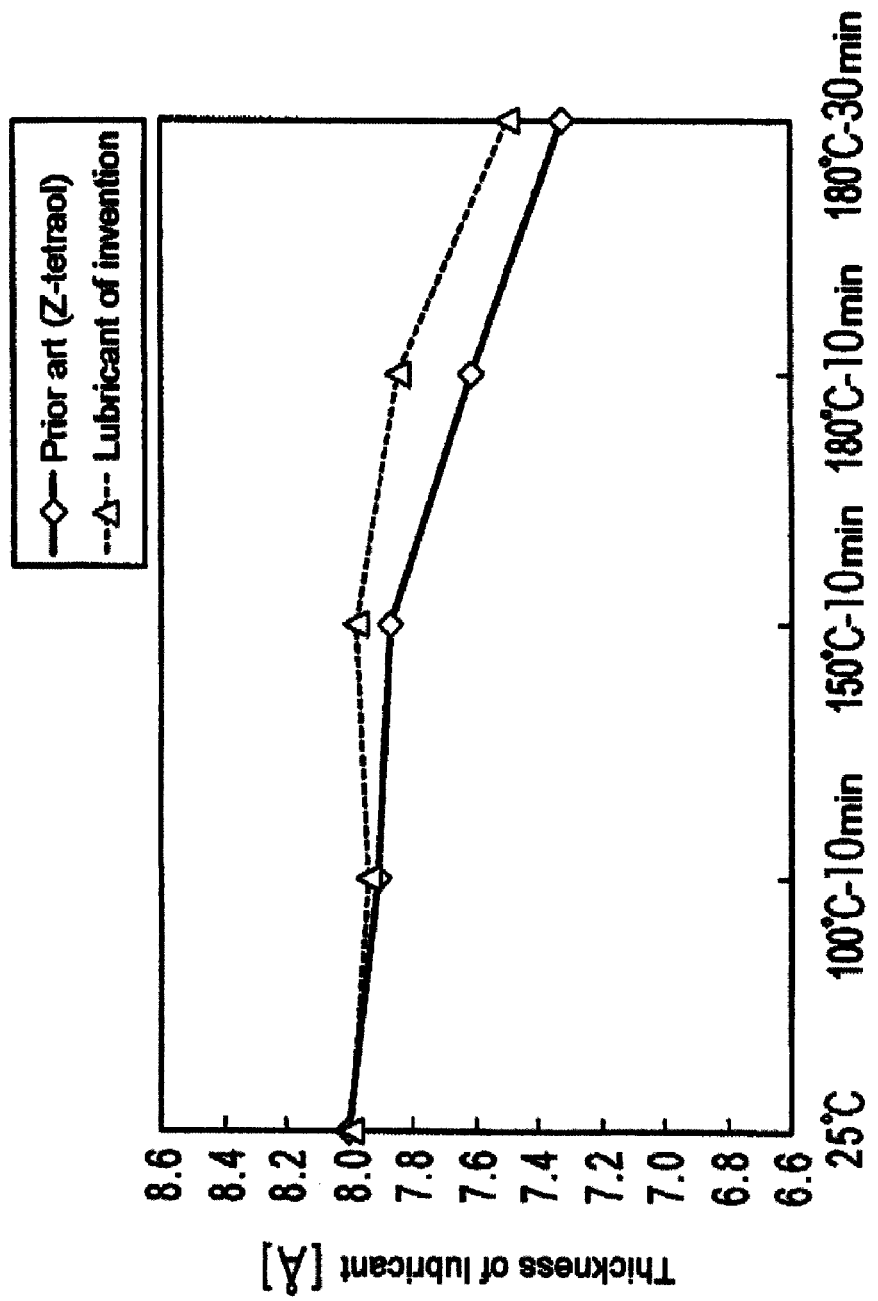
FIG. 3 shows a comparison result between a magnetic recording medium according to the invention and a magnetic recording medium of a conventional technology in an evaluation of volatilization loss upon heating in the case of a lubricant layer thickness of 0.8 nm.
Figure 4:
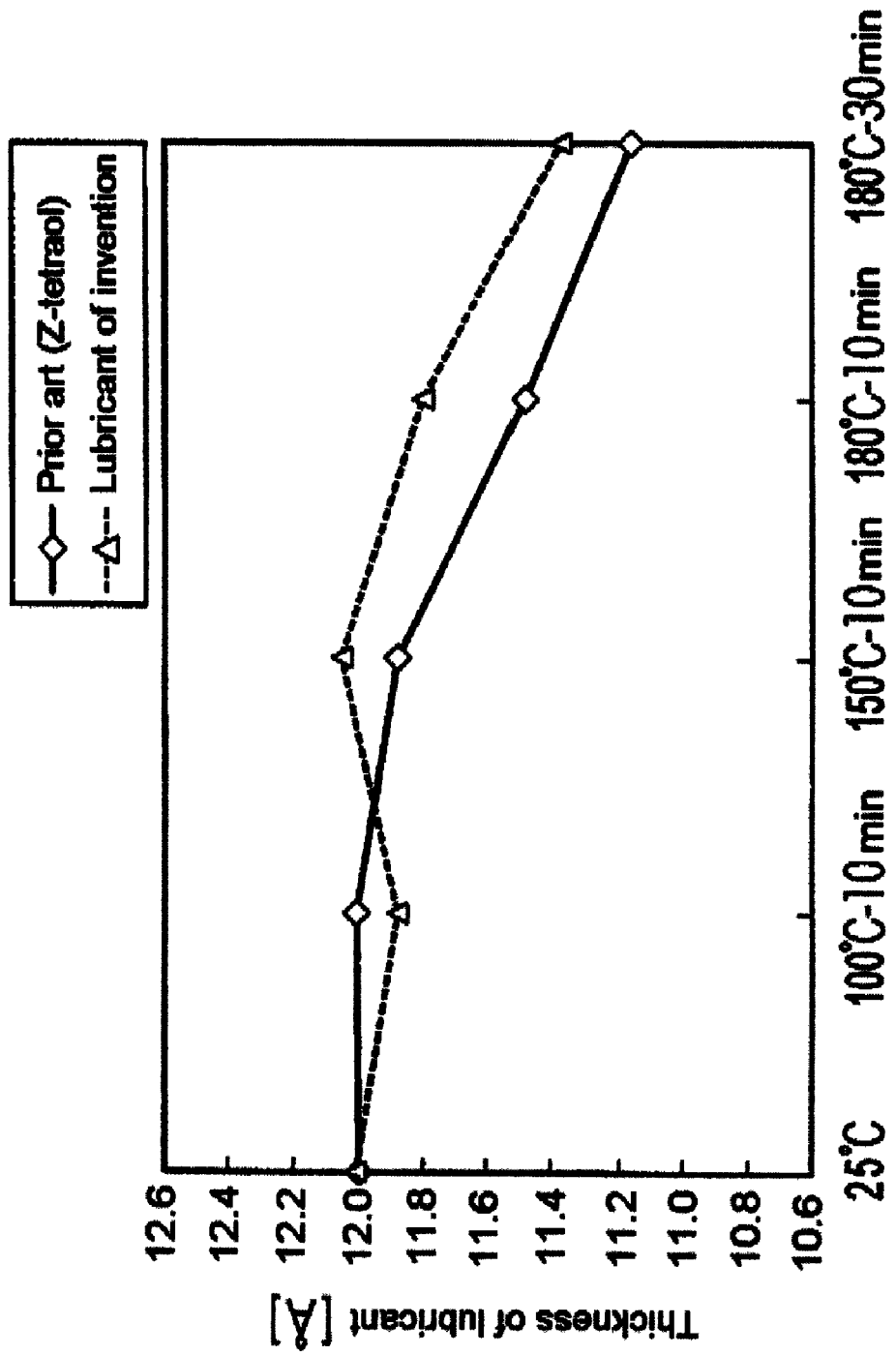
FIG. 4 shows a comparison result between a magnetic recording medium according to the invention and a magnetic recording medium of a conventional technology in an evaluation of volatilization loss upon heating in the case of a lubricant layer thickness of 1.2 nm.

FIG. 3 shows the comparison result in the case of an initial film thickness of 0.8 nm (Example 1 and Comparative Example 1 shown in Table 1), and FIG. 4 shows the comparison result in the case of an initial film thickness of 1.2 nm (Example 2 and Comparative Example 2 in Table 1).

FIG. 3 and FIG. 4 show that the lubricant according to the invention applied on a magnetic disk also resulted in a smaller loss upon heating regardless of total lubricant thickness, and tends to remain on the disk surface even in a high temperature environment.

When kept standing for 10 minutes at a temperature of 150° C., which is a temperature presumed in the thermally assisted recording process, a magnetic recording medium of the prior art underwent loss of 1 to 3% of lubricant in both cases of lubricant layer thicknesses of 0.8 nm and 1.2 nm, while a magnetic recording medium using compound (A) according to the invention exhibited very little loss, less than 1%.

Therefore, according to the invention, a magnetic recording medium for use in thermally assisted recording has been attained that maintains an initial amount of lubricant in an environment at a temperature of about 150° C.

It has been also confirmed that the above mentioned properties of the lubricant of the invention are superior to the lubricant of the prior art as long as the molecular weight of the lubricant is in the range from 500 to 10,000.

Thus, a magnetic recording medium for thermally assisted recording has been described according to the present invention. Many modifications and variations may be made to the techniques and structures described and illustrated herein without departing from the spirit and scope of the invention. Accordingly, it should be understood that media and methods described herein are illustrative only and are not limiting upon the scope of the invention.

This application is based on and claims priority to Japanese Patent Application 2007-284148, filed on Oct. 31, 2007. The disclosure of the priority application in its entirety, including the drawings, claims, and the specification thereof, is incorporated herein by reference.

DESCRIPTION OF SYMBOLS

100: substrate
102: magnetic layer
104: protective layer
106: lubricant layer
110: nonmagnetic base plate
120: plating layer

What is claimed is:

1. A magnetic recording medium for use in a thermally assisted recording system comprising at least a magnetic layer, a protective layer and a lubricant layer formed on a nonmagnetic substrate, wherein a lubricant in the lubricant layer has a heat resistance such that an amount of volatilization when the magnetic layer is heated to a temperature not lower than a temperature Tw is less than 1% with respect to an initial amount of the lubricant in an unheated condition, wherein the lubricant composing the lubricant layer is a compound represented by formula (1) and has a molecular weight in a range of 500 to 10,000

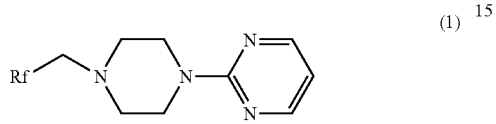
(1)

wherein "Rf" represents $CF_3CF_2CF_2O-(CF_2CF_2CF_2O)_n-CF_2CF_2$, and "n" is a positive integer.

2. The magnetic recording medium according to claim 1, wherein the temperature Tw is in a range of 150° C. to 350° C.

3. A magnetic recording medium for use in thermally assisted recording system comprising at least a magnetic layer, a protective layer and a lubricant layer formed on a nonmagnetic substrate comprising a lubricant compound having a molecular weight in a range of 500 to 10,000 which lubricant compound is represented by formula (1)

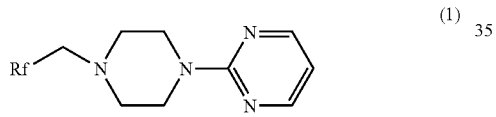
(1)

wherein "Rf" represents $CF_3CF_2CF_2O-(CF_2CF_2CF_2O)_n-CF_2CF_2$, and "n" is a positive integer,
wherein the lubricant compound has a heat resistance such that an amount of volatilization when the magnetic layer is heated to a temperature not lower than a temperature Tw is less than 1% with respect to an initial amount of the lubricant in an unheated condition, wherein Tw is in a range of 150° C. to 350° C.

4. A method of thermally assisted magnetic recording comprising:
providing a magnetic recording medium comprising at least a magnetic layer, a protective layer and a lubricant layer formed on a nonmagnetic substrate, wherein a lubricant in the lubricant layer has a heat resistance such that an amount of volatilization when the magnetic layer is heated to a temperature not lower than a temperature Tw is less than 1% with respect to an initial amount of the lubricant in an unheated condition, and
irradiating recording regions of the magnetic layer with a laser; and
applying a magnetic field to the irradiated regions of the magnetic layer with a magnetic head to record information,
wherein the lubricant composing the lubricant layer is a compound represented by formula (1) and has a molecular weight in a range of 500 to 10,000

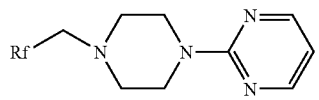
(1)

wherein "Rf" represents $CF_3CF_2CF_2O-(CF_2CF_2CF_2O)_n-CF_2CF_2$, and "n" is a positive integer.

* * * * *